United States Patent [19]

Ruetenik

[11] 4,095,561
[45] Jun. 20, 1978

[54] ANIMAL EXERCISING APPARATUS
[75] Inventor: Roger Ray Ruetenik, Vermilion, Ohio
[73] Assignee: Horsey, Inc., Vermilion, Ohio
[21] Appl. No.: 777,086
[22] Filed: Mar. 14, 1977
[51] Int. Cl.² ............................................ A01K 15/00
[52] U.S. Cl. ....................................................... 119/29
[58] Field of Search .................... 119/29, 51.11, 51 R, 119/99

[56] References Cited
U.S. PATENT DOCUMENTS

| | | | |
|---|---|---|---|
| 116,183 | 6/1871 | Hays et al. ............................ | 119/99 |
| 736,360 | 8/1903 | Burgess ................................ | 119/29 |
| 3,020,882 | 2/1962 | Browning ............................. | 119/99 X |
| 3,274,973 | 9/1966 | Woods et al. ........................ | 119/51.11 |
| 3,709,197 | 1/1973 | Moseley ............................... | 119/29 |
| 3,824,961 | 7/1974 | Webb .................................... | 119/29 |

OTHER PUBLICATIONS
Treadmill Conditioning, Roger Roetenik 10-1975, pp. 1 & 2.

Primary Examiner—Hugh R. Chamblee
Attorney, Agent, or Firm—Burton & Dorr

[57] ABSTRACT

An improved animal exercising apparatus including a releasable towing package, improved safety features, a manure scraper and container, removable side panel inserts, breast and butt restraining straps, and a variable speed motor. The improved features include angled side wall corners to prevent damage to the animal's head and neck and teeth during exercising. The releasable towing package provides separately releasable wheels and a tow bar for selective transportation of one or a plurality of exercising apparatuses. A loading guide is also provided to improve the loading of the animal. One improved embodiment is designed for use by horses whereas a second improved embodiment has angularly oriented outward extending side walls and is designed for use by livestock such as cattle and sheep. In the second embodiment an upstanding tie bar is further provided to properly exercise livestock by holding their head in the proper lead position.

2 Claims, 14 Drawing Figures

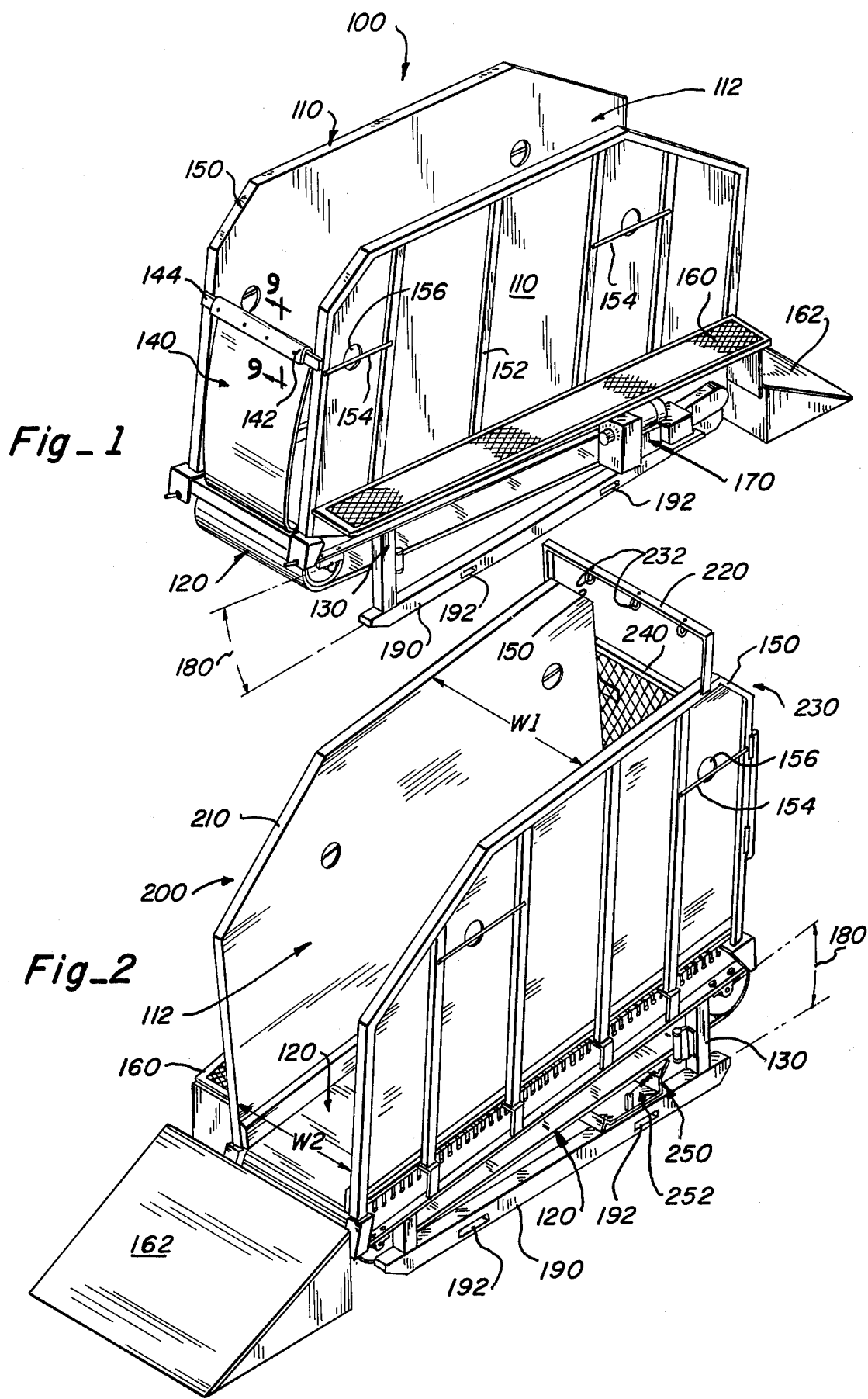

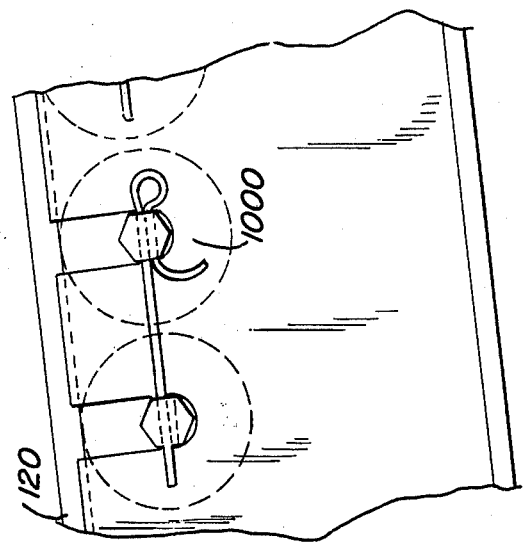
Fig.-10
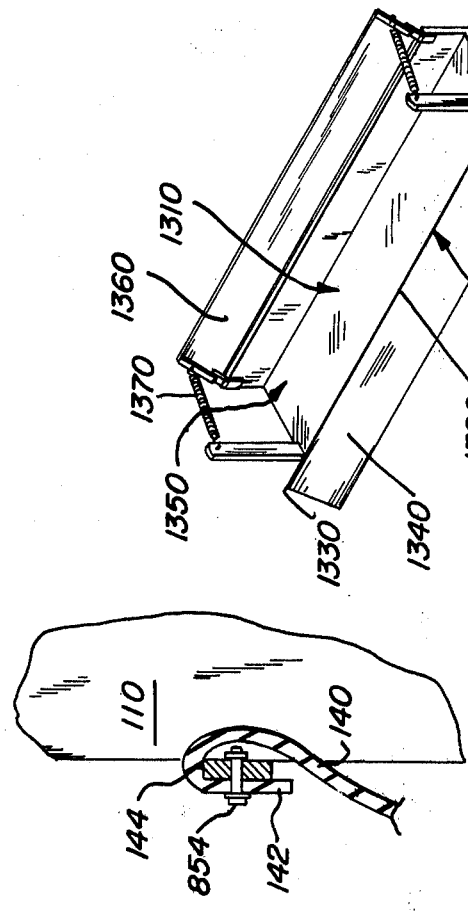
Fig.-13
Fig.-9
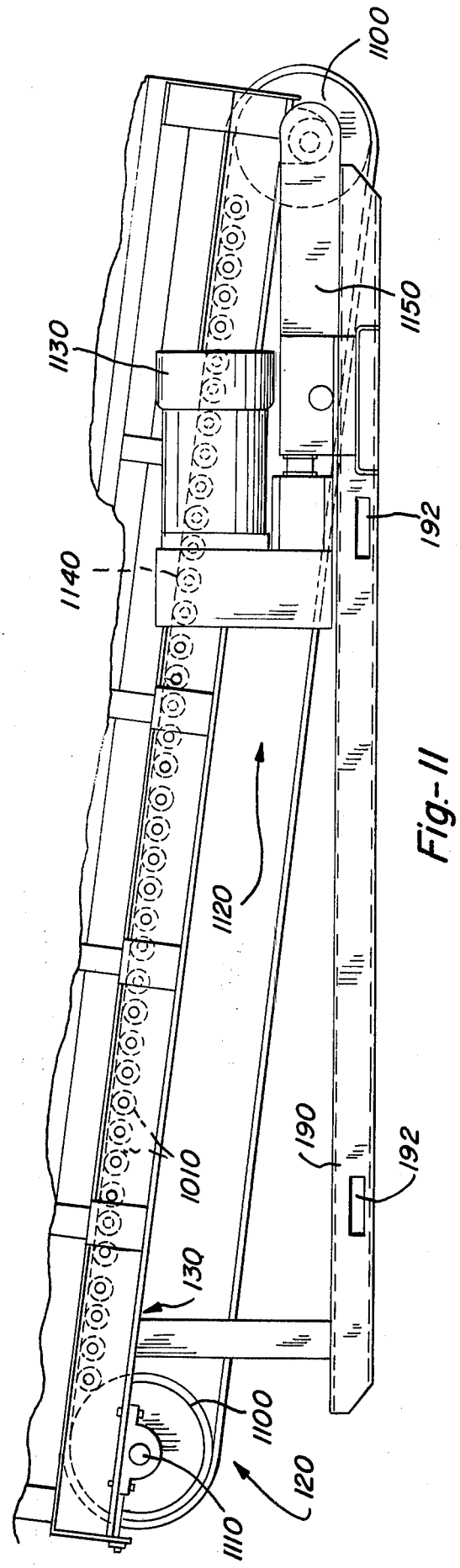
Fig.-11

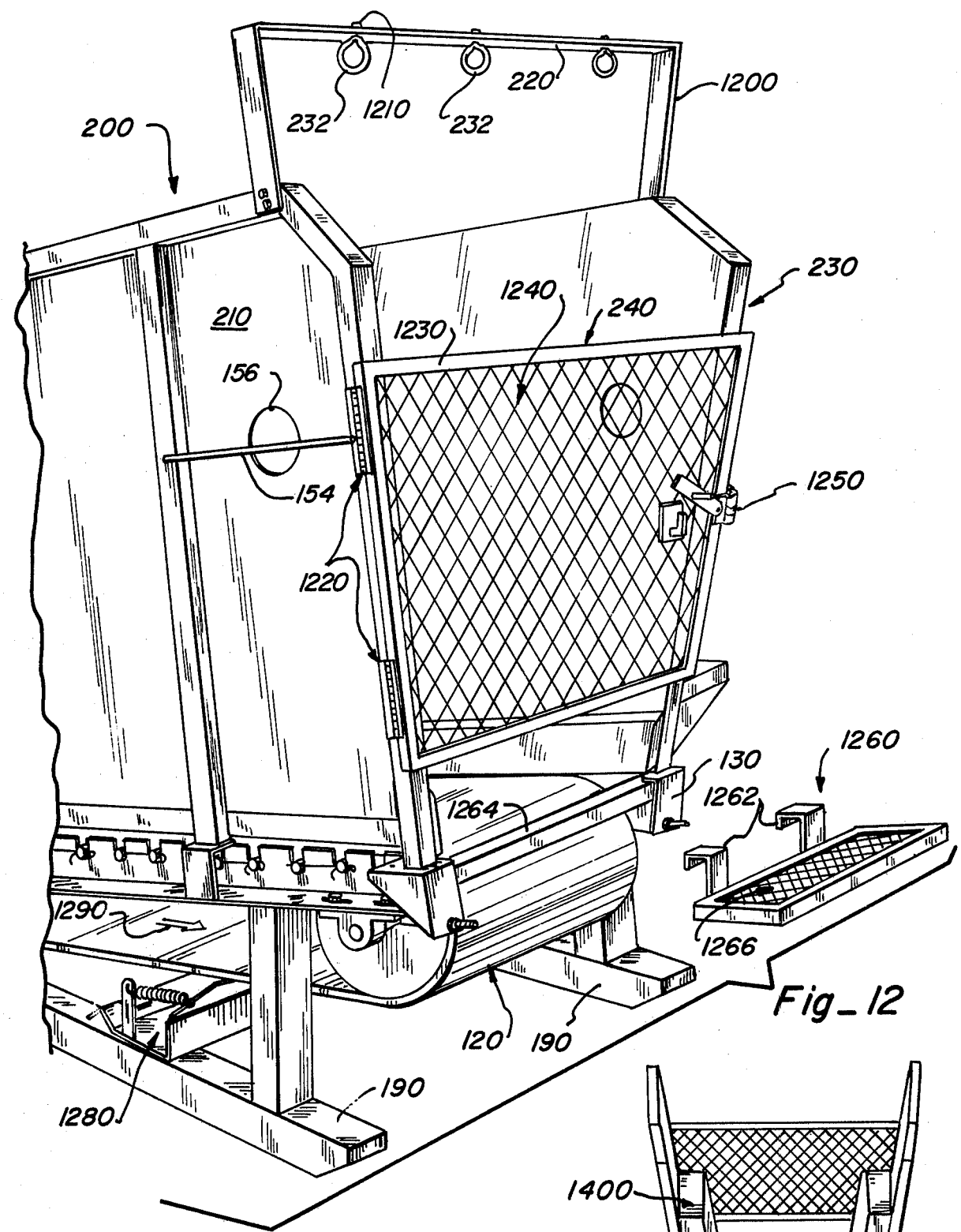
Fig_12
Fig_14

ANIMAL EXERCISING APPARATUS

BACKGROUND OF THE INVENTION

1. Field of the Invention

The present invention relates generally to animal exercising apparatuses and more particularly to a treadmill exercising apparatus having upstanding side walls.

2. Description of the Prior Art

Variously configured treadmill exercising apparatuses have been disclosed in the prior art. For example, U.S. Letters Pat. No. 736,360 issued on Aug. 18, 1903 to Burgess teaches the use of a treadmill apparatus inclined at an angle between two upstanding sides having a continuous belt over a plurality of small rollers defining the movable exercising surface and frictionally engaging two opposing end drums.

U.S. Letters Pat. No. 3,709,197 issued to Moseley, on Jan. 9, 1973 also discloses an apparatus substantially similar to the above Burgess invention and represents an improvement thereon. The Moseley apparatus comprises upstanding front and side walls and a plurality of rollers disposed under a belt providing a movable exercising surface that substantially runs the length of the stall area. The moving belt disclosed in Moseley is continuous and is returned via bottom belt carriers, the belt frictionally engages two opposing drums which extend laterally between the two opposing side rails. The Moseley apparatus is specifically disigned to operate at a plurality of different working angles or inclinations which may be selected through operation of a hand crank disposed on the forward drum. Furthermore, the Moseley apparatus provides a drag brake mechanism to impede or prevent the turning of the drum while the animal is being loaded into the apparatus. By removing the brake mechanism, the animal can then initiate its own movement; however, any undesired speed of the animal is prevented through selective application of a drag brake mechanism.

The patent issued to Townsend on May 8, 1973, as U.S. Letters Pat. No. 3,731,917 teaches the use of an improved treadmill exercising device designed for human use rather than for use by animals, the Townsend patent specifically teaches the improvement to treadmill exercising devices wherein a convenient means for adjusting the speed of the movable exercising surface is presented. Specifically, an electric motor is shown to drive the movable exercising surface of Townsend.

Unfortunately, the prior art patents to Burgess and Moseley, even when taken in combination with the patent issued to Townsend, do not offer an exercising apparatus fully usable by horses or other livestock.

A major step forward in a practical operating apparatus occured when an improved animal exercising apparatus was offered by Horsey, Inc., West Lake Road, Vermilion, Ohio 44089, as partially shown in FIG. 1. For example, research by Horsey, Inc. found that the most efficient way of conditioning horses and livestock was by utilizing a fixed 7° incline which takes approximately 30% of the weight of the animal off its front legs, thus reducing stress. The resultant physical development of the horse resides in the loin, stifle and gaskin. Another improvement over the prior art approaches by Horsey, Inc. was the feature of providing a walkway 160 so that the person loading the horse or livestock would be in a position of maximum control over the animal. Furthermore, the slanted corners 162 provide an easy access for the lead rope disposed between the animal and the person which prevents the rope from being caught on the side wall corners of the prior art approaches. A motor 170 was provided to provide constant rotation to the movable exercising surface 120. Additionally, a flexible knee guard 140 was provided at the front to protect the knees and teeth of an exercising animal. One important inprovement of the Horsey, Inc. approach over the Moseley approach, is the provision of having the horses head extend over the cross bar 144. This prevents the "claustrophobic" condition posited by the Moseley approach. Although Moseley teaches the use of padded surfaces completely enclosing the interior of the stall, no mention or discussion of such an improvement presented by the present invention is discussed. An observable problem with the prior Horsey, Inc. approach was the inconvenience of having the movable surface apparatus come to a complete stop before adjusting the speed of the drive motor. Under the teachings of the present invention, the speed of the moving exercising apparatus can be selectively changed while the surface is actually in motion.

While the above improvements by Horsey, Inc. represent significant advances, especially as to the fixed incline, over prior art approaches, further improvement based upon actual use and experience became necessary to provide a fully practical and safe device. The present invention as disclosed herein, therefore, resides in improvements over all of the above prior art approaches by Burgess, Moseley, Townsend, and Horsey, Inc.

One observable problem with all of the above prior art approaches was the problem of injury to the animal's neck and head due to the sharp upper corners of the stall side walls. Often times the animal would react rapidly to an external sound or noise and twist its head sideways into the corner thus causing possible permanent damage to its eye, head, or mouth. None of the above prior art approaches discuss solving such a problem.

Another observable problem in the above prior art approaches was a means of effectively positioning the animal in the stall area. It was found that the animal had a tendency to longitudinally move to various positions on the movable exercising surface within the stall area. None of the above prior art approaches teach the provision of a breast and a butt restraining strap to physically position the horse in the center stall area over the exercising surface. It is highly desirable to maintain the animal in the center of the treadmill for maximum control of the animal and for minimum wear of the apparatus. Strain is also eliminated.

While the above prior art Horsey, Inc. approach taught the use of a front cross bar 144 for supporting a knee guard 140, possible damage to the teeth or mouth of the animal was observed. It is well known that many horses, for example, are "cribbers". Such horses have a constant tendency to chew on objects near their mouth. If, while exercising, the animal chose to chew on cross bar 144, considerable damage to the mouth, lips or teeth of the animal could result. One improvement of the present invention, therefore, is to provide padding to this surface in a unique and novel fashion.

Another observable problem in all of the above prior art approaches is the loading of the animal into the exercising apparatus. Virtually no means are disclosed in any of the above prior art patents or combination thereof for any means for effectuating ease in loading. The present invention teaches the use of a loading guide to enable easy loading of the animal into the treadmill device.

Another observable problem in Moseley and experienced by Horsey, Inc. was the provision of circular shafts for the plurality of support rollers underneath the exercising treadmill surface. It was a common observed phenomena that the circular shafts would wear down into the frame supports under the heavy load of the animal. This problem especially became apparent after considerable use of the exercising apparatus. The present invention teaches the use of a shaft having one or a plurality of flats disposed around the periphery of the shaft to firmly anchor and prevent the shaft from turning. None of the above prior art patents or approaches alone, or in combination, suggest such an approach.

Another observable problem in the above prior art approaches is the problem encountered with animals of high excretion. There is a tendency for manure to build up onto the surface of the treadmill thereby causing the dangerous condition of slippage of the animal on the moving surface. The present invention provides a means for removing material from the surface of the treadmill and additional optional means for collecting that material. None of the above prior art approaches suggest or teach such an approach.

While the Moseley approach teaches the use of a portable exercising apparatus mounted on wheels with a towing hitch, many purchasers of such movable apparatuses are subjected to the additional cost of wheels and towing when, in fact, in operation the exercising apparatus is rarely moved. Oftentimes, the wheels deteriorate and the tow portion is mechanical surplusage. To reduce the cost of the exercising apparatus to the buyer and yet maintain the option of mobility, the present invention teaches the use of releasable wheels and a releasable tow bar. Thus, race tracks which frequently purchase numerous quantities of exercising apparatuses (race horses, for example, after a race have to be exercised to be effectively cooled and massaged for the rollers), could buy one releasable towing and wheel package adaptable to fit all of the exercising apparatuses purchased. Furthermore, a dealer selling exercising apparatuses to individuals can easily transport the apparatus to the purchaser and then remove the wheels and the towing package. Due to the special design of the present invention, a skid is provided so that the purchaser can then move the exercising apparatus conveniently at his locale by means of dragging by a tractor or the like. None of the above prior art approaches direct themselves to such a practical and economical approach as taught herein.

Finally, none of the above prior art approaches teach an embodiment of an animal exercising apparatus specifically designed for livestock other than horses. The present invention teaches such an embodiment specifically designed to meet the practical means of livestock such as cattle and sheep, having, e.g. a wire screen front for cooling.

The inventor wishes to make of record all of the following patents in addition to the above considered in his decision to apply for a patent for his novel improvements:

| INVENTOR | PAT. NO. | DATE |
| --- | --- | --- |
| Richards | 2,155,684 | April 25, 1939 |
| Grant | 2,969,768 | Jan. 31, 1961 |
| Scanlon | 3,485,213 | Dec., 1969 |
| Proctor | 3,225,744 | Dec., 1965 |

-continued

| INVENTOR | PAT. NO. | DATE |
| --- | --- | --- |
| Ladner | 3,119,374 | Jan., 1964 |
| Wood | 1,766,089 | June, 1930 |
| Gaines et al | 2,997,136 | Aug., 1961 |
| Parsons | 3,592,466 | July 1971 |

OBJECTS OF THE INVENTION

It is an object of the present invention to provide a safe new and improved apparatus for exercising animals such as horses and other livestock.

It is a further object of the present invention to provide a new and improved apparatus which is economical to the consumer.

It is another object of the present invention to provide an improved animal exercising apparatus having a manure remover operatively interacting with the movable treadmill surface.

It is another object of the present invention to provide a new and improved apparatus for exercising animals having a loading guide for aiding the loading and unloading of an animal from the exercise apparatus.

It is another object of the present invention to provide a new and improved apparatus for exercising animals having releasable wheels.

It is another object of the present invention to provide a new and improved apparatus for exercising animals having a releasable front yoke for towing.

It is another object of the present invention to provide a new and improved apparatus for exercising animals having a front pivotal gate permitting full delivery of air to the interior of the stall area.

It is still another object of the present invention to provide a new and improved apparatus directed to exercising animals having a tying bar disposed above the stall area of the apparatus having one or a plurality of tying loops affixed thereto for holding the head of the animal in position.

It is another object of the present invention to provide a new and improved apparatus for exercising animals having the front upper corner angularly cut off to prevent injury or harm to the animal's head or neck.

It is another object of the present invention to provide a new and improved apparatus for exercising animals having a variable speed motor capable of effectuating change in speed of the treadmill surface while in motion.

It is another object of the present invention to provide a new and improved apparatus for exercising horses having angularly disposed side walls defining the stall to substantially correspond to the angular side dimensions of the animal.

It is another object of the present invention to provide a new and improved apparatus for exercising animals having a skid affixed to the frame of the apparatus.

It is another object of the present invention to provide a new and improved apparatus for exercising animals having means receptive of the forks of a forklift for lifting the apparatus.

It is another object of the present invention to provide a new and improved apparatus for exercising animals having padded means for protecting the teeth and mouth of the animal while exercising.

It is another object of the present invention to provide a new and improved apparatus for exercising animals having breast and butt restraining means for centering the animal over the exercising surface.

It is another object of the present invention to provide a new and improved apparatus having a releasable step positioned at the front of the stall area.

It is another object of the present invention to provide a new and improved apparatus having releasable side panels located on the interior of the side walls for selectively adjusting the volume of the stall for differing sized animals.

It is another object of the present invention to provide a new and improved apparatus having the shaft for each roller disposed under the treadmill surface with at least one flat surface to prevent twisting or turning of the shaft during operation.

It is still a further object of the present invention to provide a new and improved apparatus for exercising animals having all or any combination of the above enumerated features incorporated into a single improved apparatus of the present invention.

SUMMARY OF THE INVENTION

The present invention comprises a first embodiment having the upper front corners of the stall angularly cut off to prevent harm or injury to the head or neck of the animal. A padded surface is further provided across a front cross bar to prevent mouth or teeth injury of the animal while exercising. Breast and butt restraining straps are provided to essentially dispose the animal over the center of the exercising surface. The restraining straps are releasably coupled to restraining bars firmly affixed to withstand considerable stress to the support braces of the side walls. A loading guide is pivotally connected to one rear end of a side wall. The loading guide is longer than the width of the stall and serves to guide the animal into the stall area while the animal is horizontally oriented on the ground. The loading guide aligns with the coupled side wall in the closed position. The shafts of the rollers supporting the movable surface of the treadmill are designed in a hexagonal shaft wherein opposing flats abut a shaft support to prevent twisting or turning of the shaft. The motor is designed to automatically change the speed of the exercising surface while the surface is in motion.

In another embodiment, the side walls are angularly disposed to adapt to the trapezoidal cross section configuration of livestock such as cattle or sheep. A front pivotal gate with latch having a screen surface is designed for the operator to walk through in order to easily load the animal into the stall area. The screen provides significant air flow into the stall to cool the animal. A manure scraper is disposed under the continuous treadmill surface and abuts the width of the surface in a scraping action under pressure of a biasing spring. A tray is provided to collect the material from the scraper. A releasable step is provided at the front of the machine to enable the operator to conveniently step out from the stall area after loading the animal. An upstanding tie bar is provided above the front top surface of the stall having one or a plurality of tying loops. In the event that a smaller animal such as a sheep is to be exercised, side panels can be mounted on the interior of the exercising stall to reduce the stall volume.

A releasable towing package is provided wherein each wheel selectively mates with the frame of the apparatus and wherein a tow bar selectively mates with the front of the frame. The frame of the apparatus is designed to have a bottom skid with forklift receptacles.

Other objects, advantages and capabilities of the present invention will become more apparent as the description proceeds taken in conjunction with the accompanying drawings.

DESCRIPTION OF THE DRAWINGS

FIG. 1 is a front perspective view of a first embodiment of the improved animal exercising apparatus of the present invention.

FIG. 2 is a rear perspective view of a second embodiment of the improved animal exercising apparatus of the present invention.

FIG. 9 is a cross-sectional representation of the mouth guard of the present invention.

FIG. 10 is a side partial planar view showing the details of the shafts and rollers of the present invention.

FIG. 11 is a partial side planar view illustrating the location of the skid and motor of the present invention.

FIG. 12 is a partial front perspective view of the second embodiment of the exercising apparatus of the present invention detailing the end gate, the releasable step, the manure scraper, and the collection tray.

FIG. 13 is a perspective view of the scraper and container of the present invention.

FIG. 14 is an end planar view showing the side panel inserts.

DESCRIPTION OF THE PREFERRED EMBODIMENT

Figure 3:
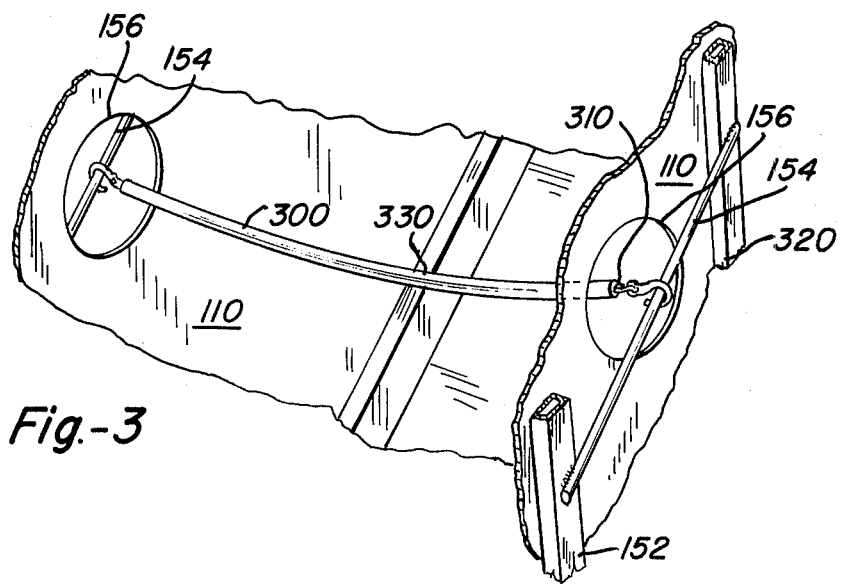
FIG. 3 is a detailed perspective view of the butt (breast) restraining strap of the present invention.

A first preferred embodiment 100 of the animal exercising apparatus of the present invention is shown in FIG. 1 to include parallel upstanding side walls 110 positioned to form a stall area 112. The floor of the stall area 110 is formed by a tread 120 which is conventionally disposed over a plurality of rollers. It is to be expressly understood that the provision of parallel upstanding side walls 110 attached to a main body 130 in cooperation with a movable exercising surface such as a treadmill 120 is conventional as disclosed by the above discussed prior art. The mechanical details of such a construction, therefore, are not necessary for the practice of the present improvements presented herein. As will be subsequently discussed in detail, the embodiment shown in FIG. 1 is specifically adaptable for use by horses.

The embodiment 100 shown in FIG. 1 includes the following improvements over prior art conventional approaches. These improvements embrace a rubber knee pad 140 which has the upper end 142 wrapped around a cross bar 144. The end 142 of the knee pad 140 serves to prevent the animal from damaging his mouth by biting on the bar 144. If a horse is a "cribber" (as a predominant number of horses are) no damage will result to the teeth or mouth of the horse due to the softness of the surface provided by end 142. The side walls 110 have the upper forward corner angularly cut off as shown by arrow 150. This improvement over prior art devices prevents the animal from hurting its neck or head on the side wall 110. If a cut off 150 were not provided, a severe risk in damaging the animal is apparent caused by the pointed surface of the corner. The side walls 110 have a plurality of vertical support braces 152. Disposed between two of the braces 152 at the front and rear are restraining bars 154. As will be discussed in the ensuing, a restraining strap can be connected to the bar 154 through a formed hole 156 to effectively restrain the animal at its breast and behind its butt. In this manner, the animal is firmly positioned in the center of the stall area 112 over the tread surface 120. The conventional longitudinal step 160 extends the length of the side walls 110 and serves to provide the operator of the machine 100 ease in loading the animal into the stall area 112. The step 160 is firmly attached to the side wall 110 and specifically, the support post 152 conventionally, as for example, by welding. A conventional loading ramp 162 is provided as an aid to load the horse into the stall area 112. The loading ramp 162 is constructed from wood, metal, or the like. A non-skid surface is usually applied on the inclined surface thereof to prevent slippage. A motor 170 is provided under the walkway 160 to provide a plurality of speeds for the tread 120 while the tread is in motion. The movable exercising surface for tread 120 is disposed on the frame or body 130 at a predetermined angle 180. The predetermined angle 180, as discussed in the above prior art discussion, is typically 7°. The movable exercising surface and the side walls 110 are assembled to be fixedly positioned at that inclination. The bottom portion or skid portion 190 is attached to the main body 130 and provides a lower skid surface upon which the apparatus 100 can be selectively moved from location to location. This movement is by dragging. Furthermore, formed holes 192 are provided in the skid member 190 which conventionally mate to the forks of a conventional forklift truck. This provides ease in transportation or lifting of the apparatus 100.

On the other hand, the second embodiment of the present invention shown in FIG. 2 is primarily adaptable for livestock, other than horses, such as cattle or sheep. The primary differences between the embodiment 100 shown in FIG. 1 and the embodiment 200 shown in FIG. 2 include the provision in embodiment 200 of angularly disposed side walls 210 wherein the width W1 between the upper portions is greater than the width W2 existing between the lower portions of the side walls 210. Furthermore, an upstanding tie bar 220 is provided near the front end 230 of embodiment 200 and disposed upstanding from the upper surfaces of the side walls 210. On the tie bar are disposed a plurality of tying hooks 232. The tying hooks 232 are adapted to receive, as will be subsequently discussed, the lead rope of the livestock. Another difference between embodiment 100 and embodiment 200 is the provision of a gate 240 located on the front end 230. The gate 240 is designed to permit the free flow of air through the interior stall area 112 of embodiment 200. Livestock heat up faster and sweat more effluently than do horses. Furthermore, a manure scraper 250 with a corresponding collection tray 252 is provided underneath the tread 120 to remove collected manure. Livestock, it is also commonly know, emit more manure and waste materials than do horses.

All improved features and other common components of embodiment 100 are correspondingly shown with the same numeral designation numbers for the second embodiment 200.

In the operation of embodiment 100, a horse is lead up the ramp 162, the user mounts walkway 160 and leads the horse into the stall area 112. The treadmill surface, at this time is not moving. The butt restraining strap, not shown, is attached to the restraining bars 154 through the formed holes 156. This prevents the horse from moving rearwardly out of the stall 112. The lead rope is then removed from the horse and the front restraining strap is interconnected between the restraining bars 154 located near the front of the machine. The operator or user dismounts from the walkway 160 and activates the motor 170 which causes the movable exercise surface 120 to commence movement. It is to be noted that movement of the exercise surface 120 does not occur until the user activates motor 170. Furthermore, there is sufficient friction in the movable exercise surface 120 to prevent the animal mounted in the stall 112 from moving the surface 120 faster than the speed determined by the motor 170. The operator can, at his selection, choose a plurality of speeds at which the animal can be exercised while the treadmill is in motion. As the horse is being exercised in the stall area 112, the horses knees may, at times, abut the knee pad 140 but will not endure any harm due to the softness of the knee pad 140 and the built-in flexibility as shown in FIG. 1. Should the horse decide to rear to either side, the cut off corner 150 serves to prevent harm or injury to the head and neck area of the horse. Furthermore, should the horse actively chew the cross bar 144, he will engage the soft surface 142 thereby effectuating no harm to his teeth or mouth. After the exercising period is complete, the horse can be unloaded by once again mounting the walkway 160 releasing the rear butt restraining strap, and guiding the horse out rearwardly from the stall area 112 onto the loading ramp 162.

The livestock exercising apparatus shown in embodiment 200 operates in substantially the same manner as described above for the horse embodiment 100. However, for livestock such as cattle and sheep, it is important to maintain their heads at a certain raised level during exercising thereof to maintain a uniformly horizontal back line and to train them in proper leading (i.e., left or right). This is accomplished by tying the lead rope connected to the head of the animal to one of the tying loops 232 disposed on the tie bar 220. If the animal has a deformed neck structure, or if the animal is desired to conform to the left handedness or right handedness of its shower, the animals head can be selectively tied off center. Furthermore, since there is not as much knee action with livestock as there is with a horse, the knee pad 140 is removed and a porous gate 240 is provided to provide increased ventilation. The gate 240 is preferably composed or constructed of screen-like material so that free air flow can be maintained in the stall area 112. Furthermore, a gate 240 is provided so that a small animal can be, if desired, loaded directly by walking on the surface 120 through the center stall area 112 and out the front of the machine 230. As will be subsequently discussed, a releasable step is provided in front of the gate 240. The side walls 210 are angularly disposed outwardly to accommodate the substantially block shape of livestock which differs from that of horses.

In FIG. 3, the details of the butt (breast) restraining strap 300 are shown. The restraining strap 300 can be made from tensil steel cable 310 or chain link having hooks 320 disposed on opposing ends thereof. Any conventional hook or latching device can be utilized at the ends of the cable 310. The length of the cable 310 is sufficient to expand the width of the stall area 112 providing a slight slack thereto as shown in FIG. 3. Encircling the cable 310 is a protective rubber hose or sheath 330. The restraining bars 154, as mentioned, are welded perpendicularly to the support braces 152. The formed hole 156 is sufficiently large so that as a user grasps the strap 300, he may easily insert the hooked end 320 onto the restraining bar 154. This design provides enduring strength since the restraining strap 300 is under continuing stress as the horse exercises on surface 120.

Figure 4:
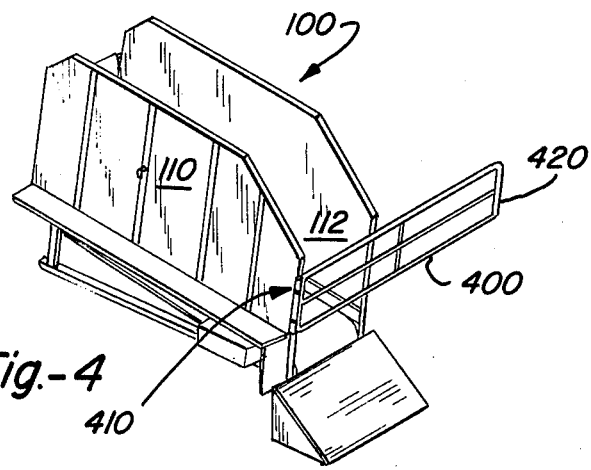
FIG. 4 is a rear perspective view of the exercising apparatus of the present invention showing the loading guide in a fully operative position.
Figure 6:
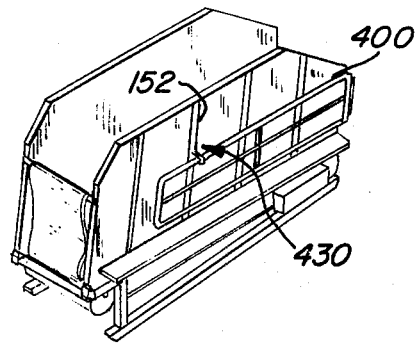
FIG. 6 is a front perspective view of the exercising apparatus of the present invention illustrating the loading guide in storage position.
Figure 5:
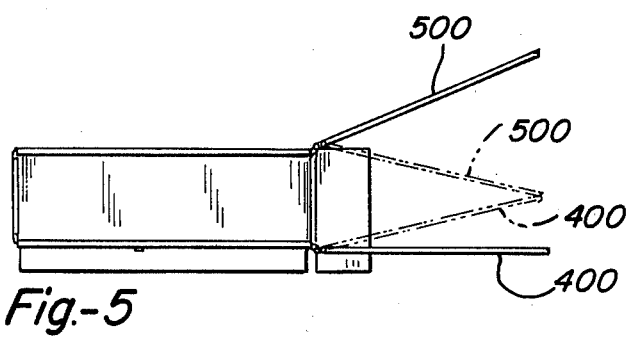
FIG. 5 is a top planar view showing the provision of two loading guides.

In FIGS. 4-6 are shown yet another improvement adaptable for use on either embodiment 100 or embodiment 200. That improvement is the provision of a loading guide 400. For sake of illustration, the loading guide 400 is shown mounted in FIG. 4 to embodiment 100, but is equally usable on embodiment 200. The loading guide 400 is of longitudinal length sufficiently extending beyond the width of the stall, as shown in FIG. 4, so that in its fully extended position as shown in FIG. 5, it is capable of acting as a guide for loading the animal into the stall area 112. The loading guide 400 is pivotally mounted at one end by means of conventional pin and guides 410 and is free swinging at the opposing end 420. The loading guide 400 can be constructed of tubular steel welded together in a configuration with proportions shown in FIG. 4. Furthermore, the loading guide 400 may be releasably mounted to the side wall 110. When not in use, the guide 400 can be pivoted rearwardly, as shown in FIG. 6, to rest against the side braces 152. A conventional latch 430 can be provided to latch the loading guide 400 in the non-used position. It is well known that animals such as horses and livestock have a tendency to shy away from directly loading into an inclined or upstanding stall area 112. The provision of a loading guide which is pivotal serves to aid the loading of the animal on a horizontal surface. Once the animal has entered the stall area 112, but before the butt restraining strap 300 can be hooked, there is a large tendency for the animal to back out. This is prevented by firmly holding the loading guide 400 in the orientation as shown in FIG. 4. Once the animal is restrained with strap 300, the loading guide 400 can be latched into position as shown in FIG. 6. A second loading guide 500 may be installed on the opposing side wall 110 in the manner shown in FIG. 5. With this approach, the two loading guides 400 and 500 can be used to squeeze the animal and force it to load as shown by the dotted lines in FIG. 5. Such an operation effectively allows one man to load the animal.

Figure 7:
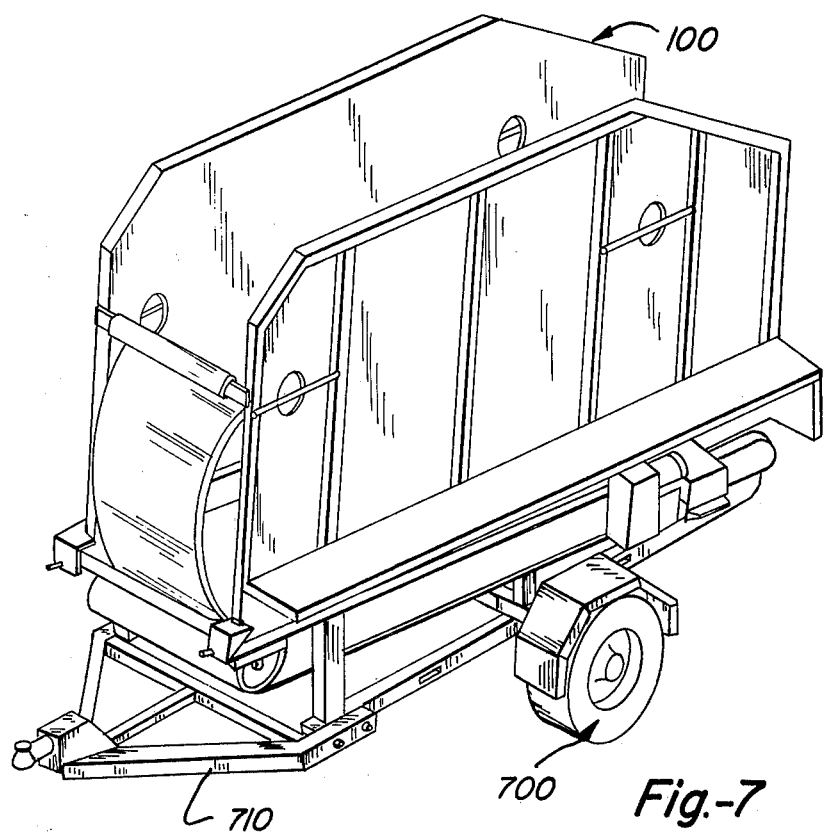
FIG. 7 is a front perspective view of the exercising apparatus of the present invention mounted to releasable wheels and to a releasable tow bar.

Another improvement pertaining to both embodiments 100 and 200 is shown in FIG. 7 on embodiment 100. The improvement concerns the provision of a releasable towing package having releasable wheels 700 and a releasable tow bar 710.

Figure 8:
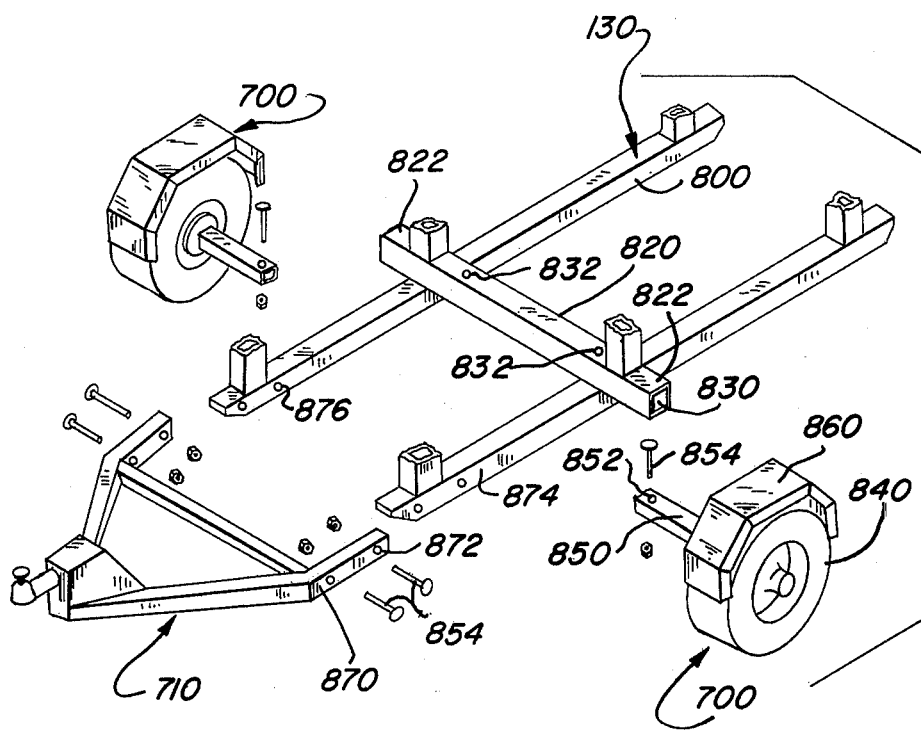
FIG. 8 is an exploded perspective view of the various components of the releasable towing package of the present invention.

In FIG. 8 are shown the details for mounting the wheels 700 and the tow bar 710 to the frame or body 130 of the exercising apparatus. The body 130 includes two longitudinally extending skids 800. The skids 800 are firmly affixed to the frame proper 130 by means of posts 810. The skids 800 cooperate with post members 810 to provide a rigid structure to the exercising apparatus in a conventional fashion. Numerous other conventional frame designs could well be utilized in this invention. Attached to the skids 800 is a cross member 820. The cross member 820 has protruding edges 822 which protrude beyond the periphery defined by the skids 800. A square channel 830 is formed at each opposing end and on the upper surface of the cross member 820 are formed holes 832.

Each of the releasable wheels 700 comprises a conventional tire 840 mounted to an axle 850 and having a fender 860 disposed thereover. The axle 850, however, is modified and is substantially a square protrusion defined to firmly and slideably engage the channel 830 of the cross member 820, the axle 850 has formed therein a hole 852 which aligns with the formed hole 832. A nut and bolt combination 854, slidably engages the formed holes 832 and 852 to firmly, but releasably, secure the wheel 700 to the frame 130.

A tow bar 710 is designed to contain rearwardly protruding members 870. The rearwardly protruding members 870 have holes 872 formed therein and the members 870 are designed to engage the outer surface 874 of each side member 800 as shown in FIG. 8. The formed holes 872 align with similarly formed holes 876 in the side member 800 and can be releasably affixed thereto by means of nut and bolt combinations 854.

In this manner, the exercise apparatus of the present invention can be selectively moved from one location to another by attaching the wheels 700 and the tow bar 710. It is not uncommon for a purchaser of the invention to acquire more than one exercising apparatus, as for example, dealers. Such purchasers need only acquire one set of wheels 700 and one towing bar 710. The overall savings is significant.

In FIG. 9, the details of the cross bar 144 and the knee pad 140 whose end 142 is wrapped over the upper surface of the cross bar member 144 are shown. The end 142 is firmly affixed to the cross bar member by means of a nut and bolt combination 854. Such an arrangement substantially completely encircles the entire outer surface of the cross bar member 144 and prevents the animal from damaging its mouth or teeth.

In FIG. 10 is shown the close-up details of the axles 1000 used to support the rollers 1010 which are positioned below the treadmill surface 120. The improvement disclosed in FIG. 10 is that of providing a hexagonal shaped shaft 1000 positioned in a slot 1020 wherein the width of the slot is substantially equal to the width between opposing flats of the shaft 1000. A single cotter pin 1030 can be arranged to prevent twisting or turning of two axles 1000, as shown.

In FIG. 11 is shown a side planar view of the bottom of the exercising apparatus of the present invention highlighting the construction of the movable exercising surface 120. The conventional tread 120 is disposed in an endless belt over two opposing conventional drums 1100. The drums 1100, as shown in FIG. 1, extend the width of the tread 120. Each drum 1100 freely rotates about an axle 1110 which is conventionally mounted to the frame 130. Disposed beneath the surface of the tread 120 are a plurality of rollers 1010. It is to be expressly understood that the rollers 1010, the revolving opposing drums 1100, and the tread 120 cooperate to provide a movable exercising surface. The frame 130, as mentioned, is positioned above a skid 190 having forklift holes 192 formed therein.

Also mounted on one skid 190 is a motor drive assembly 1120 which includes a motor 1130, a transmission 1140, and a drive transfer arrangement 1150. The motor 1130 is that conventionally manufactured by Reliance Electric Company. The transmission assembly 1140 is also conventionally manufactured by Reliance Electric Company and the drive assembly 1150 comprises Reeves Vari-Speed Module by Reliance Electric Company.

In operation, the transmission 1140 can be selectively adjusted to impart varying speeds to the tread surface 120. The motor 1130 does not become activated until the animal is loaded within the stall area 112 and is properly restrained as previously discussed. The transmission 1140 can then be selectively activated to provide a plurality of varying speeds to the tread surface 120. It is to be expressly understood that the speed of the surface 120 can be changed while the animal is already in motion in the stall area 112.

In FIG. 12 are shown the details of various improvements suitable for the livestock treadmill embodiment 200. The tie bar 220 is disposed above the upper surfaces of the side walls 210 and is formed from a metal bar 1200 which is affixed by conventional means 1210 to opposing side walls 210. On the tie bar are provided a plurality of tie loops 232 which are also conventionally mounted by means 1210. The combination of the tie bar and tying loops enable the user to have sufficient means for properly positioning the head of the animal in the stall. For example, it is difficult to train cattle for proper leading in the show ring (i.e. left- or right-hand lead), by tying the head to a left or right tying hook proper training is easily accomplished.

A gate 240 is also shown in FIG. 12, to provide an exit or entry from the front 230 of the exercising apparatus 200. The gate 240 is pivotally mounted by hinges 1220 or any other conventional pivotal means. The periphery of the gate 240 is in the shape of a trapezoid and substantially corresponds to the shape of the angular side walls 210. The gate is formed from a rigid bar-like outer surface 1230 surrounding a screen mesh 1240. The gate 240 is designed via the screen mesh 1240 to allow the free flow of air to the body surfaces of the livestock disposed within the stall 112. A suitable latch 1250 is provided to selectively effectuate opening and closing of the gate 240.

A releasable step 1260 is also provided as shown in FIG. 12. The releasable step 1260 has two mounting hooks 1262 which are designed to fit across a cross bar 1264 which is connected to the frame 130. The step 1260 has a stepping surface 1266 also composed of a screen like mesh.

A manure scraping arrangement 1280 is shown in FIG. 12 mounted to opposing upper surfaces of the skids 190. Details of the scraper are shown in FIG. 13 to include a scraper 1300 and a collection tray 1310. The scraper 1300 extends for the width of the tread 120 and is composed of an angled scraping blade 1320 which is pivotally mounted at point 1330 to a perpendicular end 1340 of the collection tray 1310. The tray is composed of the perpendicular end 1340 integral with a flat collection surface 1350 and an angled end 1360 is disposed opposite therefrom. The movable surface moves in the direction of arrow 1290 as shown in FIG. 12. Any manure or material collected on the surface of the treadmill in an adhesion-like fashion is effectively scraped from the surface thereof under the tension of the spring 1370 forcing the scraping surface 1320 against the tread 120. In this manner, all obnoxious material can be removed to continually provide a surface with traction.

In FIG. 14 is shown yet another improvement to the livestock treadmill 200 of the present invention. This improvement relates to releasable side panel inserts 1400. The releasable side panel inserts effectively reduce the internal volume of the stall 112 in a plurality of varying fashions dependent upon the thickness 1410 of the side panel inserts. The side panels can be effectively connected, releasably, to the side walls 210. Furthermore, the side panel inserts 1400 as shown in FIG. 14 maintain the same trapezoidal shape as previously discussed for the livestock treadmill side wall configuration.

Although the present invention has been described with a certain degree of particularity, it is understood that the present disclosure has been made by way of example and that changes in details of structure may be made without departing from the spirit thereof.

What is claimed is:

1. In an inclined treadmill having a movable tread and front and side walls disposed on opposing sides of said tread, said side walls being able to contain an animal on said tread with the head of said animal extending forward of said tread, said head further extending forwardly of said treadmill, an improvement to said treadmill comprising:

at least one loading guide releasably and pivotally connected at an end to the rear edge of one of said side walls, said loading guide being substantially rectangular in shape with a length more than the width between said side walls and a height less than the height of said side walls, the aforesaid end of said loading guide being positioned near the vertical center of said edge, said loading guide being capable of freely swinging at the second end in an arc from the rear of said treadmill to substantially side-by-side alignment with said one side wall, said loading guide being further capable of selectively abutting the rear of said animal to direct said animal in the direction of the moveable tread between said side walls, said loading guide being capable of aligning with said side wall rear edges for temporarily restraining said animal in said treadmill, means for releasably attaching said loading guide to said one side wall when said loading guide is in the aforesaid side-by-side alignment, each of said side walls having the upper front corner angularly slanted to allow said animal's head to extend beyond the confines of said side walls thereby preventing injury to said animal's head, means operably connected to said moveable tread for imparting movement thereto after said animal is loaded into said treadmill, said imparting means being further capable of selectively imparting a plurality of speeds to said surface when said surface is moving, means for selectively restraining the breast of said animal, said restraining means engaging front portions of said side walls to position said animal behind said front wall of said treadmill, a frame connected to said treadmill, said frame having at least two opposing female mating surfaces disposed substantially midway between said side walls, said frame further having two opposing protrusions extending forwardly from said opposing surfaces, at least two wheels, the center of each of said wheels having an extending male mating surface, said male mating surface being cooperative with said female surface for releasably coupling thereto, and a front towing yoke releasably coupled to said forward extending protrusions.

2. In an exercising apparatus for animals having a moveable exercising surface on the floor of said stall, the front of said surface being fixedly inclined at a predetermined elevation, said apparatus comprising:

a body having upwardly extending side walls, said side walls defining a stall of trapezoidal cross-section, each of said side walls further being angularly oriented to have the width between the upper portions of said stall greater than the width between the lower portions of said stall, said trapezoidal cross-section being greater than the trapezoidal cross-sectional width of said animal, means operably connected to said exercising surface for imparting movement thereto after said animal is loaded into said stall, said imparting means being further capable of selectively imparting a plurality of speeds to said exercising surface, a gate pivotally connected to the front end of one of said side walls, said gate conforming to said side wall trapezoidal cross-section being operably latched to said front end of the remaining side wall, said gate being capable of allowing air to circulate from outside of said treadmill into the area between said side walls, means mounted above said side walls for selectively positioning the head of said animal when said animal is exercising, said positioning means being capable of orienting the head of said animal for a predetermined lead, means cooperative with said exercising surface for removing material therefrom, and means cooperative with said removing means for storing said material.

* * * * *